United States Patent
Lee

(10) Patent No.: US 11,427,145 B2
(45) Date of Patent: Aug. 30, 2022

(54) ROOF AIRBAG FOR VEHICLES AND CONTROL METHOD TO DEPLOY SAME

(71) Applicant: HYUNDAI MOBIS CO., LTD., Seoul (KR)

(72) Inventor: Dong Oh Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/248,605

(22) Filed: Jan. 29, 2021

(65) Prior Publication Data
US 2021/0245692 A1 Aug. 12, 2021

(30) Foreign Application Priority Data
Feb. 7, 2020 (KR) .................. 10-2020-0015154

(51) Int. Cl.
- *B60R 21/013* (2006.01)
- *B60R 21/213* (2011.01)
- *B60R 21/26* (2011.01)
- *B60R 21/00* (2006.01)

(52) U.S. Cl.
CPC .......... *B60R 21/013* (2013.01); *B60R 21/213* (2013.01); *B60R 21/26* (2013.01); *B60R 2021/0018* (2013.01); *B60R 2021/26058* (2013.01)

(58) Field of Classification Search
CPC ................ B60R 21/213; B60R 21/214; B60R 2021/26058
See application file for complete search history.

(56) References Cited

U.S. PATENT DOCUMENTS

| | | | | |
|---|---|---|---|---|
| 5,366,241 A * | 11/1994 | Kithil | ............ | B60R 21/013 |
| | | | | 280/735 |
| 7,690,684 B2 * | 4/2010 | Tobaru | ............ | B60R 21/13 |
| | | | | 280/756 |
| 8,033,571 B2 * | 10/2011 | Hyde | ............ | B60R 21/36 |
| | | | | 188/371 |
| 9,994,182 B1 * | 6/2018 | Jaradi | ............ | B60R 21/214 |
| 10,328,887 B2 * | 6/2019 | Dziurda | ............ | B60R 21/13 |
| 10,434,849 B1 * | 10/2019 | Ronald | ............ | B60J 5/0455 |
| 10,539,941 B2 * | 1/2020 | Hyde | ............ | A41D 13/018 |
| 10,688,955 B2 * | 6/2020 | Shin | ............ | B60R 21/214 |
| 11,040,687 B2 * | 6/2021 | Jayakar | ............ | B60R 21/2338 |

(Continued)

FOREIGN PATENT DOCUMENTS

| | | | | |
|---|---|---|---|---|
| CN | 205836757 U * | 12/2016 | ............ | B60R 21/214 |
| DE | 102008062268 A1 * | 6/2010 | ............ | B60R 21/213 |

(Continued)

*Primary Examiner* — Nicole T Verley
(74) *Attorney, Agent, or Firm* — DLA Piper LLP (US)

(57) ABSTRACT

A roof airbag for vehicles and a control method to deploy the roof airbag are proposed. The roof airbag, which protects occupants by minimizing reduction of internal pressure of the airbag in an accident event in which a vehicle rolls over several times in sequence, includes: a main inflator and sub-inflator which generate gas; and a controller configured to ignite the main inflator to deploy an airbag cushion when a rollover accident of a vehicle occurs, and configured to ignite the sub-inflator to increase internal pressure of the airbag cushion when a secondary accident occurs following the primary rollover accident of the vehicle.

5 Claims, 4 Drawing Sheets

(56) References Cited

U.S. PATENT DOCUMENTS

| | | | | |
|---|---|---|---|---|
| 2005/0087966 A1* | 4/2005 | Suekuni | ................. | B60R 21/26 |
| | | | | 280/730.2 |
| 2006/0138754 A1* | 6/2006 | Hirata | ................. | B60R 21/0132 |
| | | | | 280/730.1 |
| 2006/0290113 A1* | 12/2006 | Bernat | ................. | B60R 21/231 |
| | | | | 280/730.1 |
| 2007/0052226 A1* | 3/2007 | Tobaru | ................... | B60R 21/13 |
| | | | | 280/756 |
| 2012/0200069 A1* | 8/2012 | Kato | ................. | B60R 21/2346 |
| | | | | 280/730.2 |
| 2015/0054269 A1* | 2/2015 | Kolatschek | ............ | B60R 21/01 |
| | | | | 280/737 |
| 2020/0307496 A1* | 10/2020 | Jimenez | ................ | B60R 21/214 |
| 2021/0245692 A1* | 8/2021 | Lee | ........................ | B60R 21/26 |

FOREIGN PATENT DOCUMENTS

| | | | | | |
|---|---|---|---|---|---|
| DE | 102015116142 | B4 * | 10/2020 | ........... | B60R 21/013 |
| DE | 102020207722 | A1 * | 1/2021 | ......... | B60R 21/0134 |
| EP | 2228267 | B1 * | 8/2013 | ......... | B60R 21/0132 |
| JP | 2004520993 | A * | 7/2004 | | |
| JP | 2006193036 | A * | 7/2006 | | |
| JP | 2007055392 | A * | 3/2007 | ......... | B60R 21/0132 |
| KR | 10-2017-0008098 | A | 1/2017 | | |
| WO | WO-2019168580 | A1 * | 9/2019 | ........... | B60R 21/214 |

* cited by examiner

ROOF AIRBAG FOR VEHICLES AND CONTROL METHOD TO DEPLOY SAME

CROSS REFERENCE TO RELATED APPLICATION

The present application claims priority to Korean Patent Application No. 10-2020-0015154, filed Feb. 7, 2020, the entire contents of which is incorporated herein for all purposes by this reference.

BACKGROUND OF THE INVENTION

Field of the Invention

The present invention relates generally to a roof airbag for vehicles, which is capable of stably protecting occupants by minimizing reduction of internal pressure of the airbag in an accident event in which a vehicle rolls over several times in sequence, and to a control method to deploy the roof airbag.

Description of the Related Art

In general, airbags are installed in the interior of a vehicle to protect occupants from impacts that occur during vehicle collisions.

An airbag cushion, which is normally provided in a folded state in an airbag housing, is instantaneously deployed due to gas quickly supplied into the airbag cushion by an inflator, when a sensor detects a vehicle collision. Whereby, occupants in the vehicle can be protected from impact of the vehicle collision.

Meanwhile, when a vehicle having a panoramic roof rolls over, a panoramic roof glass is broken and an occupant may be ejected out of the vehicle through a roof part. Accordingly, a roof airbag is installed in the roof part to prevent the occupant from being ejected out of the vehicle, thereby reducing injuries of the occupant.

During a rollover accident of a vehicle, the time it takes for a vehicle to roll over varies in different situations, and secondary and tertiary rollover accidents may occur after the primary rollover accident.

However, in a conventional roof airbag, an airbag cushion is deployed at a certain time without considering various situations of vehicle rollover, and in particular, after the deployment, internal pressure of the airbag cushion is decreased over time.

At the time when the secondary and tertiary rollover accidents occur after the primary rollover accident, the airbag cannot provide proper performance due to the lack of internal pressure of the airbag, thereby causing the deterioration of the occupant protection performance.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a roof airbag for vehicles, which is capable of stably protecting occupants by minimizing reduction of internal pressure of the airbag in an accident event in which a vehicle rolls over several times in sequence, and to propose a control method to deploy the roof airbag.

In order to achieve the above objective, according to one aspect of the present invention, there is provided a roof airbag for vehicles. The roof airbag includes: a main inflator and sub-inflator which generate gas; and a controller configured to ignite the main inflator to deploy an airbag cushion when a rollover accident of a vehicle occurs, and configured to ignite the sub-inflator to increase internal pressure of the airbag cushion when a secondary rollover accident occurs following the primary rollover accident of the vehicle.

The sub-inflator may be configured to have a smaller gas capacity than a gas capacity of the main inflator.

The roof airbag may include a gas guide, wherein a first end of the gas guide may be connected to an end of the airbag cushion, and a second end of the gas guide may be connected to the main inflator and the sub-inflator.

The main inflator and the sub-inflator may be arranged to face each other.

A control method to deploy a roof airbag for vehicles may include: deploying, by a controller, an airbag cushion by igniting a main inflator when a rollover accident of a vehicle occurs; and increasing, by the controller, internal pressure of the airbag cushion by igniting a sub-inflator when a secondary rollover accident occurs following the primary rollover accident of the vehicle.

The sub-inflator may be configured to have a smaller gas capacity than a gas capacity of the main inflator.

Through the above-described technical solution, when a secondary rollover accident occurs following a primary rollover accident of a vehicle, the roof airbag of the present invention is operated as follows. During the primary rollover accident, the controller ignites only the main inflator to quickly deploy the roof airbag. Then, during the secondary rollover accident, the controller ignites the sub-inflator to additionally supply gas into the roof airbag. Accordingly, the internal pressure of the roof airbag can be maintained in a state increased to a certain level and occupant protection performance can be improved.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
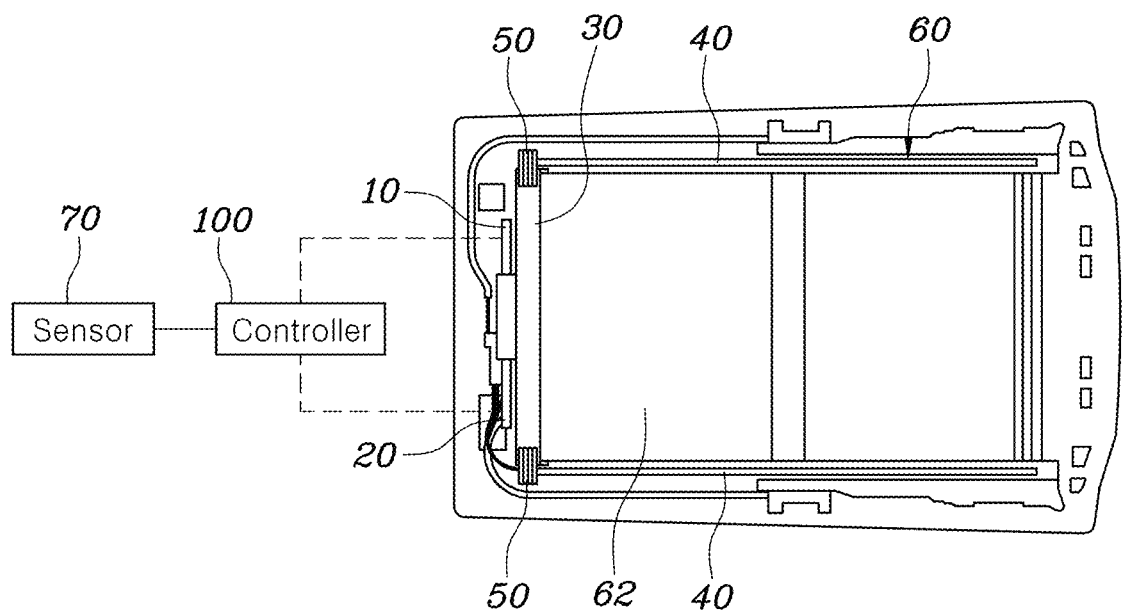
FIG. 1 is a view showing a state before deployment of a roof airbag according to the present invention.

Hereinbelow, exemplary embodiments of the present invention will be described with reference to the accompanying drawings.

In the following description, the structural or functional description specified to exemplary embodiments according to the concept of the present invention is intended to describe the exemplary embodiments, so it should be understood that the present invention may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present invention are not limited to the embodiments which will be described hereinbelow with reference to the accompanying drawings, but all of modifications, equivalents, and substitutions are included in the scope and spirit of the invention.

It will be understood that although the terms first and/or second, etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present invention belongs. It must be understood that the terms defined by the dictionary are identical with the meanings within the context of the related art, and they should not be ideally or excessively formally defined unless the context clearly dictates otherwise.

Exemplary embodiments will be described hereafter in detail with reference to the accompanying drawings. Like reference numerals given in the drawings indicate like components.

Figure 2:
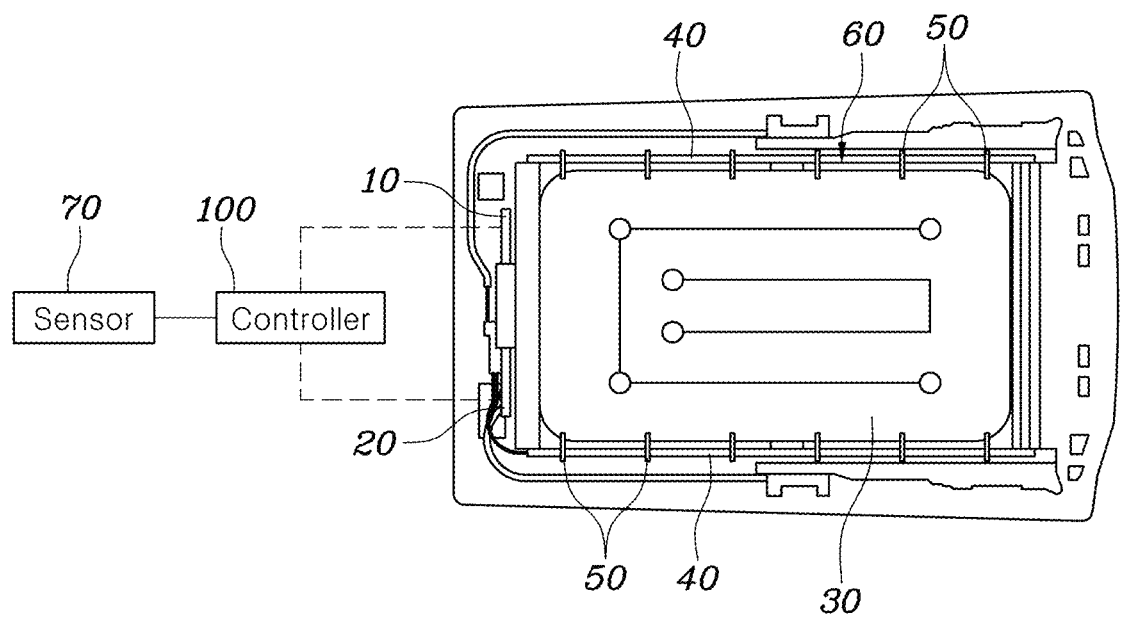
FIG. 2 is a view showing a state in deployment of the roof airbag according to the present invention.

Meanwhile, FIG. 1 is a view showing a state before deployment of a roof airbag according to the present invention, and FIG. 2 is a view showing a state in deployment of the roof airbag according to the present invention.

Referring to the drawings, a structure of a roof airbag device applicable to the present invention will be described. The roof airbag is installed in a roof of a vehicle having a panoramic roof part 60.

In the roof airbag, an airbag cushion 30 is assembled to a module bracket, the airbag cushion 30 includes a main inflator 10 and a sub-inflator 20 that generate gas according to ignition operation of an ignition device.

Guide wires 40 are provided on opposite sides of the roof part 60 in a front and rear longitudinal direction. Based on the deployment state of the airbag cushion 30, guide rings 50 are fastened to the opposite sides of the airbag cushion 30 in the front and rear longitudinal direction at predetermined intervals, and the guide rings 50 move back and forth along the guide wires 40$n$ while being inserted in the guide wires 40.

That is, when gas is generated by igniting the main inflator 10 and the sub-inflator 20 or one of the main inflator 10 and the sub-inflator 20, the gas is supplied into the airbag cushion 30 to initiate deployment of the airbag cushion 30. In the deployment process, the guide rings 50 fastened to the airbag cushion 30 move along the guide wires 40, and then the airbag cushion 30 is deployed in the front and rear direction at a lower end of a roof glass 62 and an upper end of a roof awning. Whereby, the airbag cushion 30 covers the roof glass 62 of the panoramic roof part 60 to prevent an occupant from being ejected out of the vehicle through the roof part 60.

Meanwhile, a controller 100 may be provided in the roof airbag according to the present invention to control the ignition timing of the main inflator 10 and the sub-inflator 20.

In detail, the controller 100 ignites the main inflator 10 during a rollover accident of the vehicle to deploy the airbag cushion 30. When a secondary rollover accident occurs following the primary rollover accident, the controller 100 ignites the sub-inflator 20 to control the airbag cushion 30 to maintain the deployment state thereof.

For example, when a sensor detects a secondary rollover accident of the vehicle, the controller 100 may ignite the sub-inflator 20 to supply the gas to the airbag cushion 30.

In addition, in order to detect the rollover situation of the vehicle, the sensor 70 mounted to the vehicle may be used to detect rotation angle, angular speed, and angular acceleration with respect to a rolling direction. The detected signals are sent to the controller 100 to detect the rollover situation of the vehicle.

For example, according to the exemplary embodiment of the present invention, the controller 100 may be realized by a nonvolatile memory (not shown), which consists of an algorithm configured to control operations of various components of a vehicle or data regarding software instructions to play the algorithm, and a processor (not shown), which is configured to perform operations described below using the data stored in the memory. Here, the memory and processor may be realized as separate chips. Alternately, the memory and processor may be realized as an integrated single chip. The processor may have one or more forms.

That is, when the vehicle rolls over again after the primary rollover accident, during the primary rollover accident, the roof airbag is quickly deployed by igniting only the main inflator 10, and during the secondary rollover accident, the roof airbag is supplied with gas by igniting the sub-inflator 20.

Accordingly, as the gas is additionally supplied during the secondary rollover accident, the internal pressure of the airbag may be increased and maintained above a certain level even at the point of the second rollover accident, thereby improving occupant protection performance.

In the present invention, the sub-inflator 20 may have a smaller gas capacity than a gas capacity of the main inflator 10.

That is, the sub-inflator 20 may use an inflator with a smaller capacity than a capacity of the main inflator 10 for increasing the internal pressure of the airbag cushion 30 that has been deployed by the main inflator 10, thereby reducing manufacturing costs of the roof airbag device.

In addition, the present invention is also configured such that a first end of a gas guide is connected to a center portion of an end of the airbag cushion 30, and a second end of the gas guide is connected to the main inflator 10 and the sub-inflator 20.

That is, gas generated by the main inflator 10 and the sub-inflator 20 flows into the airbag cushion 30 via the gas guide, so the structure of a gas inlet path may be simplified and the airbag device may be designed compactly.

The main inflator 10 and the sub-inflator 20 may be arranged to face each other.

Preferably, since the main inflator 10 and the sub-inflator 20 are arranged to be symmetrical at opposite sides of the second end of the gas guide, the layout of the airbag device may be optimized by proper placement of the inflators.

Meanwhile, a method for deploying the roof airbag according to the present invention may include deploying the airbag cushion and increasing internal pressure.

In the deploying, when a rollover accident of a vehicle occurs, the controller 100 ignites the main inflator 10 to deploy the airbag cushion 30.

In the increasing internal pressure, when a secondary rollover accident occurs following the primary rollover accident, the controller 100 ignites the sub-inflator 20 to increase the internal pressure of the airbag cushion 30.

Figure 3:
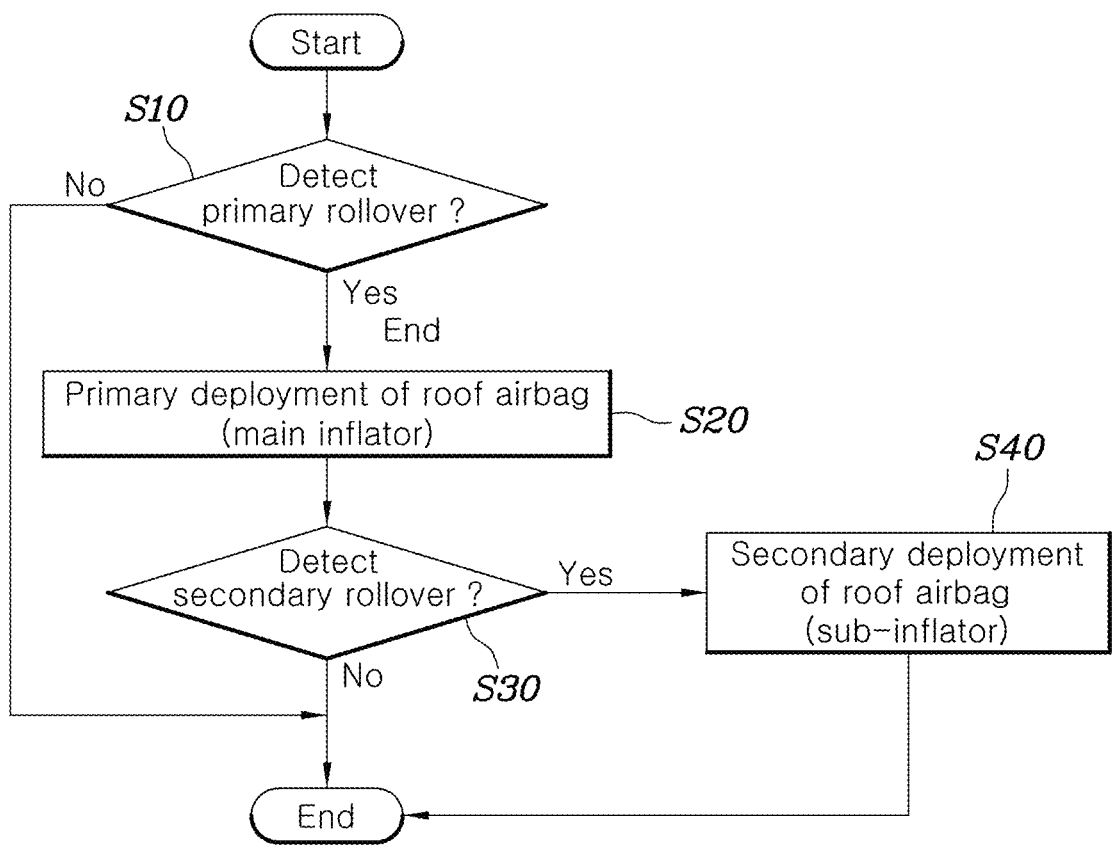
FIG. 3 is a flowchart showing a process of controlling deployment of the roof airbag according to the present invention.

FIG. 3 is a flowchart showing a process of controlling the deployment of the roof airbag according to the present invention. Hereinbelow, a flow of controlling the deployment of the roof airbag will be described with reference to the drawing, the controller determines whether a situation in which the vehicle rolls over occurs, on the basis of signals detected by the sensor 70 (S10).

As a result of the determination in S10, when it is determined that a rollover accident of the vehicle will occur, the controller ignites the main inflator 10 to supply gas into the airbag cushion 30 (S20).

Accordingly, the airbag cushion 30 is quickly expand-deployed to cover the roof part 60 so that occupants can be protected.

In addition, in the process of deploying the airbag cushion 30, the controller determines whether a secondary rollover accident of the vehicle occurs, on the basis of signals detected by the sensor 70 (S30).

As a result of the determination in S30, when it is determined that the secondary rollover accident of the vehicle will occur, the controller ignites the sub-inflator 20 to supply gas into the airbag cushion 30 (S40).

Accordingly, the internal pressure of the airbag cushion 30 is increased and the airbag cushion 30 covers the roof part 60, so that the occupants can be protected.

Figure 4:
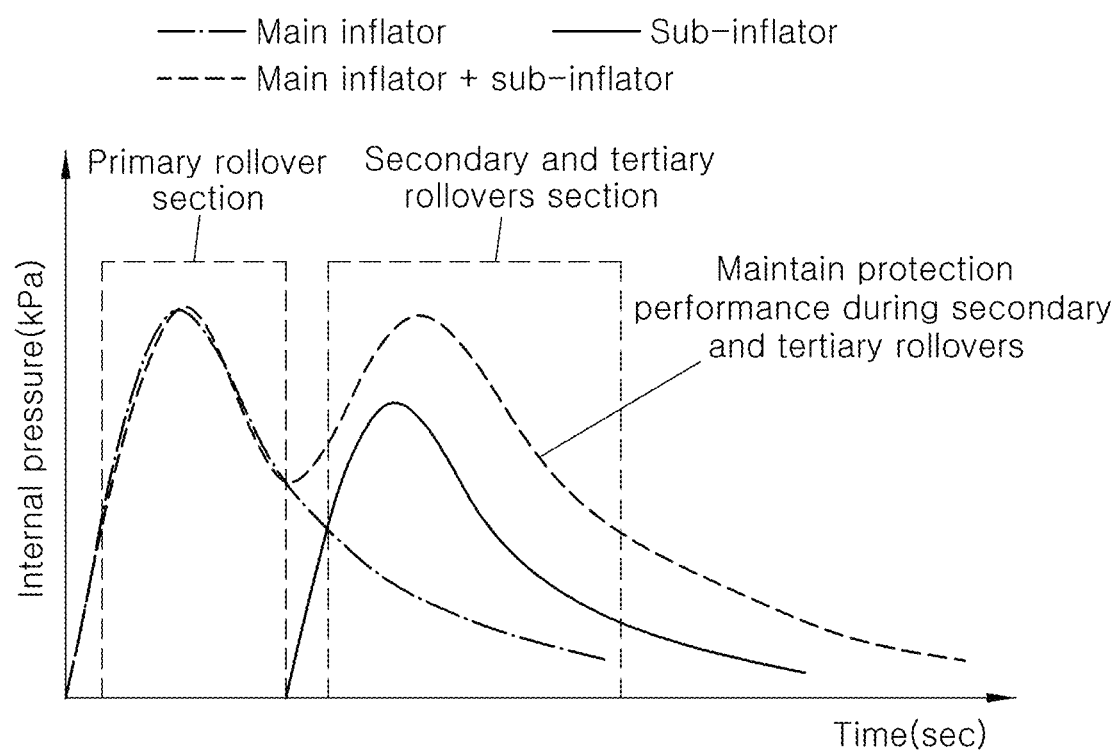
FIG. 4 is a view comparing internal pressure of the roof airbag in response to whether or not the roof airbag deployment control according to the present invention is performed.

FIG. 4 is a view comparing internal pressure of the roof airbag in response to whether or not the roof airbag deployment control according to the present invention is performed. During the primary rollover accident of the vehicle, as the gas is supplied via the main inflator 10, the internal pressure of the roof airbag is generated above a certain level, thereby protecting the occupants.

When the secondary rollover accident occurs in sequence, since the internal pressure of the airbag cushion 30 is gradually decreased over time in a structure without the sub-inflator 20, the occupants cannot be properly protected due to the lack of internal pressure at the secondary rollover timing.

However, in the case of the present invention with the sub-inflator 20, the gas may be supplied into the airbag cushion 30 even at the secondary rollover timing to increase the internal pressure of the airbag cushion 30 again, thereby protecting the occupants.

As described above, when the secondary rollover accident occurs following the primary rollover accident of the vehicle the roof airbag of the present invention is operated as follows. During the primary rollover accident, the controller ignites only the main inflator 10 to quickly deploy the roof airbag. Then, during the secondary rollover accident, the controller ignites the sub-inflator 20 to additionally supply gas into the roof airbag. Accordingly, the internal pressure of the roof airbag may be maintained in the state increased to a certain level and occupant protection performance may be improved.

Although the preferred embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A roof airbag for vehicles, the roof airbag comprising:
   a main inflator and sub-inflator which generate gas;
   a controller configured to ignite the main inflator to deploy an airbag cushion when a primary rollover accident of a vehicle occurs, and configured to ignite the sub-inflator to increase internal pressure of the airbag cushion when a secondary rollover accident occurs following the primary rollover accident of the vehicle; and
   a single gas guide, wherein a first end of the gas guide is connected to an end of the airbag cushion, and a second end of the gas guide is connected to the main inflator and the sub-inflator.

2. The roof airbag of claim 1, wherein the sub-inflator is configured to have a smaller gas capacity than a gas capacity of the main inflator.

3. The roof airbag of claim 1, wherein the main inflator and the sub-inflator are arranged to face each other.

4. A control method to deploy a roof airbag for vehicles, the control method comprising:
   deploying, by a controller, an airbag cushion by igniting a main inflator to supply gas to the airbag cushion through a single gas guide when a primary rollover accident of a vehicle occurs; and
   increasing, by the controller, internal pressure of the airbag cushion by igniting a sub-inflator to supply additional gas to the airbag cushion through the single gas guide when a secondary rollover accident occurs following the primary rollover accident of the vehicle.

5. The control method of claim 4, wherein the sub-inflator is configured to have a smaller gas capacity than a gas capacity of the main inflator.

\* \* \* \* \*